United States Patent Office 2,889,372
Patented June 2, 1959

2,889,372
STABILIZATION OF PHENOLS

Duncan James Munro, Norton-on-Tees, England, assignor to Imperial Chemical Industries Limited, London, England, a corporation of Great Britain No Drawing. Application June 25, 1957
Serial No. 667,968

Claims priority, application Great Britain July 6, 1956

10 Claims. (Cl. 260—620)

This invention relates to the stabilisation of phenols.

Many phenols are susceptible to oxidation, for example by exposure to the atmosphere, which can cause the formation of objectionable odour and colour. We have found that this process can be inhibited by treating the phenol with an amino acid.

According to the present invention therefore there is provided a composition of matter which comprises at least one phenol which is susceptible to atmospheric oxidation resulting in discolouration and/or objectionable odour, and a small amount as hereinafter defined of an amino acid.

Also according to the present invention there is provided a process for the stabilization of a phenol of the kind described, in which the said phenol is treated with an amino acid.

By the term "small amount," we mean in this specification an amount which is at most 5% by weight of the phenol. A suitable small amount is between approximately 0.01 and 2% by weight of the said phenol.

The amino acid may be used as such in the present invention, or in the form of a salt of its acid group, or as a salt of its amino group. Suitable salts of the acid group include for example alkali metal or alkaline earth metal salts. Suitable salts of the amino group include for example salts of mineral acids such as for example hydrochloric and sulphuric acid, or salts of suitable organic acids.

It is preferred that the amino acids of this invention contain only one acidic group.

It is also preferred that the amino acids of this invention contain only one amino group. This may be in any position relative to the acid group of the amino acid. For example, suitable acids are alpha, beta or gamma amino acids, alpha amino acids being preferred. The amino group may be unsubstituted as in glycine, or substituted, but an unsubstituted group is preferred. Other substituent groups may be present in the amino acid molecule, as for example in histidine. Such groups are preferably non-aromatic groups.

Suitable phenols which may be used in the present invention include for example phenol itself, phenyl phenols, cresols, xylenols, their further alkylated derivatives and mixtures of these compounds.

It is a feature of this invention that the phenol may be treated with the amino acid at any convenient stage in the manufacture of the phenol, for example during the precipitation of a solid phenol from a crude phenolic mixture. It is convenient to treat the phenol with the amino acid at such a stage in the form of an aqueous or alcoholic solution.

The following example illustrates the application of the present invention to the stabilisation of 4-methyl-2,6-di-tert.-butylphenol.

EXAMPLE

In each case 270 grams of the crude liquid phenol were mixed with 510 mls. of methanol, and solid phenol was precipitated at 15° C. by the addition of 90 mls. of water. Where indicated, an amino acid was added, either in the water or in the methanol, according to its solubility. The precipitated phenol, which was predominantly 4-methyl-2,6-di-tert.-butylphenol, was separated from mother liquor, dried, and stored at 50° C. in the dark in porcelain dishes covered by clock glasses. The colour of each sample was determined as follows. A 1" Lovibond cell was filled with molten sample and the colour was determined, using red and yellow slides, from the formula:

$$C = Y + 3R$$

where C=colour of sample and Y and R are respectively the yellow and red colour units required to match the sample. (See "Standard Methods for Testing Tar and its Products," 3rd edition, 1950, page 214, published by the Standardisation of Tar Product Tests Committee, London.) The results are given in Tables 1, 2 and 3 in which the concentration of amino acid is given as weight percentage of the precipitated phenol.

Table 1

| Additive | Additive conc., percent | Colour | | |
|---|---|---|---|---|
| | | Initial | After 6 days | After 12 days |
| Nil | | 1.4 | 22.3 | 37.3 |
| Hippuric acid | 0.35 | 1.2 | 12.5 | 17.7 |
| Anthranilic acid | 0.35 | 1.5 | 9.0 | 15.7 |
| Glycine | 0.35 | 1.6 | 1.8 | 3.6 |

Table 2

| Additive | Additive conc., percent | Colour | | |
|---|---|---|---|---|
| | | Initial | After 3 weeks | After 6 weeks |
| Nil | | 1.3 | 47.9 | 54.2 |
| N-methyl-taurine | 0.375 | 1.1 | 23.3 | |
| Sodium-beta-laurylamino-propionate | 1.875 | 1.2 | 5.1 | 41.7 |
| Sodium-alpha-methyl-beta-laurylamino-propionate | 1.875 | 1.3 | 3.4 | 24.9 |

Table 3

| Additive | Additive conc., percent | Colour | | |
|---|---|---|---|---|
| | | Initial | After 2 weeks | After 7 weeks |
| Nil | | 2.2 | 54.4 | 74.0 |
| l-cysteine hydrochloride | 0.35 | 2.2 | 12.4 | 19.6 |
| l-histidine hydrochloride | 0.35 | 3.9 | 5.5 | 8.3 |
| dl-Alanine | 0.203 | 2.1 | 3.0 | 6.6 |

I claim:

1. A composition of matter consisting essentially of an air-oxidizable phenol selected from the group consisting of phenol, unsubstituted phenol monocyclic phenols, unsubstituted lower-alkylated monocyclic phenols and as a stabilizer therewith a small amount of a compound selected from the group consisting of glycine, alanine, hippuric acid, anthranilic acid, N-methyl-taurine, sodium-beta-lauryl-amino-propionate, sodium-alpha-methyl-beta-lauryl-amino-propionate, cysteine hydrochloride, and histidine hydrochloride.

2. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of glycine.

3. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of dl-alanine.

4. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of hippuric acid.

5. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of anthranilic acid.

6. A composition of matter consisting essentially of an air-oxidizable phenol selected from the group consisting of phenol, unsubstituted phenyl monocyclic phenols, unsubstituted lower alkylated monocyclic phenols and as a stabilizer therewith a small amount of N-methyl-taurine.

7. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of sodium-beta-lauryl-amino-propionate.

8. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of sodium-alpha-methyl-beta-lauryl-amino-propionate.

9. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of l-cysteine hydrochloride.

10. A composition of matter consisting essentially of an air-oxidizable phenol selected from the group consisting of phenol, unsubstituted phenyl monocyclic phenols, unsubstituted lower-alkylated monocyclic phenols and as a stabilizer therewith a small amount of l-histidine hydrochloride.

References Cited in the file of this patent

UNITED STATES PATENTS

| | | |
|---|---|---|
| 2,578,725 | Michel et al. | Dec. 18, 1951 |
| 2,727,928 | Menn et al. | Dec. 20, 1955 |

UNITED STATES PATENT OFFICE

CERTIFICATE OF CORRECTION

Patent No. 2,889,372                                           June 2, 1959

Duncan James Munro

It is hereby certified that error appears in the printed specification of the above numbered patent requiring correction and that the said Letters Patent should read as corrected below.

Column 2, line 60, for "phenol monocyclic" read -- phenyl monocyclic --.

Signed and sealed this 31st day of May 1960.

(SEAL)
Attest:

KARL H. AXLINE                                         ROBERT C. WATSON
Attesting Officer                                  Commissioner of Patents